United States Patent
Herman

[11] 3,851,544
[45] Dec. 3, 1974

[54] TRANSMISSION WITH TORQUE CONVERTER AND HYDROSTATIC DRIVES

[75] Inventor: Stanley W. Herman, Indianapolis, Ind.

[73] Assignee: General Motors Corporation, Detroit, Mich.

[22] Filed: Nov. 10, 1972

[21] Appl. No.: 305,300

[52] U.S. Cl.................... 74/677, 74/687, 74/730
[51] Int. Cl... F16h 47/04, F16h 47/08, F16h 47/00
[58] Field of Search .......... 74/674, 677, 720.5, 687, 74/675

[56] References Cited
UNITED STATES PATENTS

| | | | |
|---|---|---|---|
| 3,272,032 | 9/1966 | Smalinskas | 74/677 |
| 3,373,636 | 3/1968 | Livezey et al. | 74/720.5 |
| 3,383,953 | 3/1968 | Christenson | 74/687 X |
| 3,665,787 | 5/1972 | Wilkinson | 74/674 |

Primary Examiner—Samuel Scott
Assistant Examiner—P. S. Lall
Attorney, Agent, or Firm—Charles R. White

[57] ABSTRACT

A first power path from the transmission input to a planetary differential unit is through a hydrodynamic torque converter. At coupling a second power path from the input to a control gear of the differential through operatively connected hydrostatic pump and motor units is additionally employed to provide a split torque drive for vehicle cruising. For extended output speed ratios, the output speed of the hydrostatic motor is progressively decreased to decrease the speed of the control gear to cause an increase in output speed while engine speed is maintained constant.

4 Claims, 1 Drawing Figure

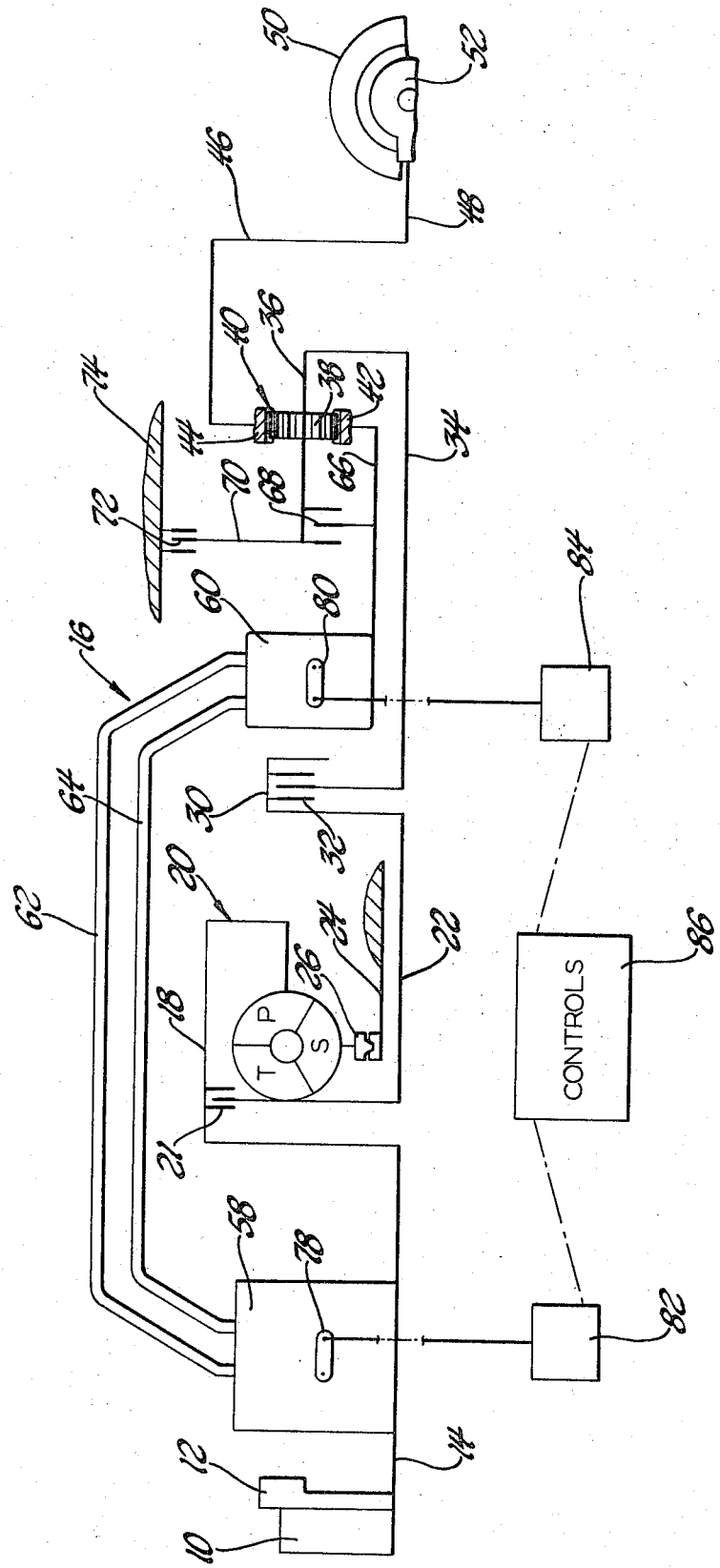

TRANSMISSION WITH TORQUE CONVERTER AND HYDROSTATIC DRIVES

This invention relates to power transmissions having a dual power path drive system where the drive is initially through a torque converter and where hydrostatic units are subsequently employed to provide an additional power path for split torque drive and to further provide control for extended top speed ratios.

Many prime movers such as reciprocating piston engines whose output must rotate to prevent stall-out at the start of vehicle drive are designed to operate with optimum efficiency at substantially constant speeds. Conventional transmissions incorporating a hydrodynamic fluid unit and change speed gearing for engines having a wide range of efficient operating speeds are generally not compatible with constant speed engines. All hydrostatic transmissions for constant speed engines generally require hydrostatic pump and motors of large size and displacement and therefore have limited usage. Furthermore, transmission of torque by hydrostatic fluid power introduces a power loss and such transmissions are generally not satisfactory for the normal top gear or cruising condition of the vehicle when the highest efficiency is required. Prior shunt type transmissions incorporating a mechanical power path in addition to the hydrostatic drive to improve efficiency are normally limited to transmissions requiring only a small range of ratios and do not offer extended output speed ratio drive at constant speed conditions.

The transmission of this invention is suitable for different types of prime movers but is particularly compatible with reciprocating piston prime mover engines which are operated at constant speeds. In this transmission a first power path from an engine is through a hydrodynamic torque converter to an input of a planetary gear differential unit drivingly connected to a transmission output. A second power path from the engine is through variable displacement hydrostatic pump and motor units to a control gear of the differential unit. Initial vehicle propulsion drive is solely through the torque converter with the differential locked. Since large torques are not required of the hydrostatic units they are preferably of small size and stroke. At coupling the differential is unlocked and the hydrostatic units are set at a predetermined displacement to drive the control gear of the differential to cooperate with the converter drive to provide output split forward drive. The forward speed of the control gear can be progressively decreased to provide for extended output speeds with high overall transmission efficiency. When the control gear is held stationary by the hydrostatic units, an overdrive through the first power path is provided. Subsequently this overdrive to the output may be increased by hydrostatically driving the control gear progressively to higher speed in the negative direction with torque flowing through both power paths to combine on the output. For reverse, a brake is engaged to condition the planetary differential unit for all hydrostatic reverse drive. The hydrostatic motor can be placed at full stroke and the pump displacement may be advanced to provide for their gear multiplied hydrostatic reverse drive.

It is a feature, object and advantage of this invention to provide a new and improved transmission having hydrodynamic and hydrostatic drives selectively employable to provide torque multiplication for performance and to provide extended output speed ratio drive for highly efficient vehicle cruising.

Another feature, object and advantage of this invention is to provide a dual power path transmission in which one of the power paths includes a hydrodynamic unit and the other power path has hydrostatic pump and motor units which are selectively employed after initial vehicle propulsion to provide for extended output speed ratio drive.

Another feature, object and advantage of this invention is to provide a drive system where the initial phase of drive is through a torque converter and where the drive reverts to a hydromechanical output split at the converter coupling for extended output speed ratio drive at constant engine speed conditions.

These and other features, objects and advantages of this invention will become more apparent from the following detailed description and drawings in which:

The FIGURE is a diagrammatic view of a preferred embodiment of this invention.

In the FIGURE there is a prime mover such as a reciprocating piston engine 10, whose speed is controlled by a governor 12, which drives an input shaft 14 of a transmission 16. This shaft is drivingly connected to the rotatable housing 18 of a hydrodynamic torque converter 20. The torque converter has a bladed pump P, a bladed turbine T and a bladed stator S arranged to form a torus for circulating transmission oil fed thereto. The pump P is drivingly connected to the converter housing 18 and is driven in a clockwise direction by the engine, viewing the transmission from the front, to pump the transmission oil into the turbine T. The turbine, driven in a clockwise direction by the oil pumped thereto, is drivingly connected to a turbine shaft 22 which extends along the rotational axis of the transmission. The stator is connected to a ground sleeve 24 through a one way brake 26. This one way brake holds the stator from rotating in a counterclockwise direction, so that it directs fluid exiting from the turbine T into the pump to effect multiplication of input torque. As the turbine accelerates to pump speed the one way brake releases to permit the stator to freewheel in a clockwise direction so that the converter enters into the coupling phase of operation to transmit torque hydraulically with no torque multiplication. A clutch 21 operatively disposed in the converter 20 is selectively engageable to connect the pump P and turbine T to lock the converter for all mechanical drive.

The turbine shaft 22 is drivingly connected to a rotatable drum 30 that houses a multiplate clutch 32 that is selectively engageable to drivingly connect the turbine shaft 22 with an intermediate shaft 34. The intermediate shaft extends rearwardly from the turbine shaft and is drivingly connected to a carrier 36 for the planetary gears 38 of a planetary gearset 40. As shown in the drawing the planetary gears mesh with a sun gear 42 and a ring gear 44. The ring gear is drivingly connected to a rotatable drum 46 which, in turn, is drivingly connected to a transmission output shaft 48. This output shaft extends along the axis of the transmission and is drivingly connected to the road wheels 50 through the torque multiplying gearing of a conventional final drive differential 52.

In addition to driving the pump P of the converter the engine 10 is drivingly connected by input shaft 14 to a variable displacement hydrostatic pump 58. This hydrostatic pump is hydraulically connected to a variable displacement hydrostatic motor 60 by fluid conducting lines 62 and 64 that circulate fluid between these two hydrostatic units to allow the pump 58 to hydraulically drive the motor 60.

The motor 60 drives a shaft 66, concentric with the intermediate shaft 34, which is drivingly connected to the sun gear of the planetary gear unit 40. A clutch 68, operatively disposed between the carrier 36 and shaft 66, is selectively engageable to lock the elements of the planetary gearset so that they can be rotatably driven through the torque converter as a unit. The carrier 36 is also drivingly connected to an annular plate 70 which provides the rotatable portion of a selectively engageable grounding brake 72 having friction plates splined to the transmission housing 74.

The hydrostatic pump and motor 58 and 60 are variable stroke units and have control levers 78 and 80 that can be selectively turned to a plurality of positions to accordingly set the displacement for any displacement from zero to maximum positive or negative displacement to adjust the quantity and direction of hydraulic fluid circulated between the units. These levers are operatively connected to servos 82 and 84 that are energized by signals from the control 86.

In the preferred mode of operation in propelling a vehicle using this invention, the converter is charged with fluid, the hydrostatic units are initially set at zero stroke and the clutches 30 and 68 are engaged. The engine throttle, not shown, is opened and the power flow from the engine to the road wheels is through the torque converter, the turbine shaft 22, the intermediate shaft 34, the locked planetary gearset 40 and reduction ratio gearing of the final drive differential. As torque requirements decrease and the turbine accelerates to pump speed, the converter enters the coupling phase of operation and the engine reverts to control by governor 12 so that engine speed is maintained. At this time the controls 86 are actuated to adjust the stroke of the hydrostatic pump and motor from zero to a predetermined high stroke setting, and clutch 68 is disengaged so that there will be a split drive to the planetary gearset 40. Under these conditions the gearset 40 acts as a differential drive unit with the carrier driven clockwise through the torque converter while the sun gear is driven in the same direction by the hydrostatic units. By adjusting the stroke of the hydrostatic units the vehicle operator has a measure of control over the proportion of power transmitted by the alternate power paths. If the converter slips at the time of shift to the split torque forward drive, the displacement of the hydrostatic pump or motor can be increased to increase the power transmitted to the sun gear to prevent any decrease in speed of output shaft 48.

Instead of increasing the displacement of the hydrostatic units to prevent any dip in the speed of the output shaft 48 at the time of shift to split drive forward, lock up clutch 21 can be engaged to eliminate converter slip. As soon as the output shaft is up to speed the lock up clutch 21 is released so that the hydrodynamic drive through the converter can readily adapt to any sudden changes in the hydrostatic drive.

For subsequently increasing output speed beyond this split torque drive, while maintaining constant engine speed, the hydrostatic displacement controls are actuated to reduce displacement of at least one of the hydrostatic units to decrease the speed of the sun gear 42 of the planetary gearset to cause the output speed to increase. When the displacement of the unit has been decreased to zero the sun gear will be held stationary to provide for overdrive with power flow again entirely through the converter. Subsequent change of the displacement of the one unit from zero to the negative direction will cause the control gear to be driven in the negative direction with progressive increase of the forward overdrive to the output.

For reverse operation the brake 72 is engaged while both clutches 30 and 68 are released. Under these conditions the hydrostatic motor may be placed at full stroke and the pump displacement may be progressively advanced to provide gear multiplied all hydrostatic reverse drive.

While a preferred embodiment has been shown and described to illustrate the invention, various changes and modifications may be made without departing from the scope of the invention set forth in the following claims.

I claim:

1. A transmission for a reciprocating piston engine comprising transmission input and output means, a hydrodynamic torque converter having pump means operatively connected to said input means and having turbine means driven by fluid pumped thereto from said pump means, a simple planetary gear unit having a sun gear, a ring gear and planet gears drivingly connecting said sun and ring gears and further having a carrier for said planet gears, means directly connecting said ring gear with said transmission output means, first selectively engageable clutch means for drivingly connecting said turbine means with said planetary carrier of said gear unit, second selectively engageable clutch means operatively connected to said carrier and said sun gear for locking the members of said planetary gear unit together so that said torque converter can drive said output means, a hydrostatic pump unit connected in series with said input means and said torque converter, means directly drivingly connecting said hydrostatic pump unit to said transmission input means, a hydrostatic motor unit hydraulically connected to said hydrostatic pump unit, torque transmitting shaft means directly connecting said hydrostatic motor means to said sun gear of said planetary unit, and displacement control means operatively connected to at least one of said hydrostatic units to provide for the hydrostatic drive of said sun gear when set at a predetermined stroke and said second clutch means is released so that said transmission output means is forwardly driven by said torque converter and said hydrostatic units and to further provide for the overdrive of said output means as the speed of said sun gear is subsequently reduced to zero by reducing the displacement of one of said hydrostatic units to zero.

2. The transmission of claim 1 wherein a selectively engageable brake means is operatively connected to said carrier so that said displacement control can be increased while said clutches are released and said brake means is engaged to provide for gear multiplied all hydrostatic reverse drives.

3. In a transmission for an engine having an output that must rotate to prevent engine stall at the start of vehicle drive, transmission input means drivingly connected to the output of the engine, transmission output means, a hydrodynamic torque converter having a rotatable housing, said converter further having pump means drivingly connected to said housing and having turbine and stator means, one way brake means operatively connected to said stator to hold said stator from rotating in one direction to permit said converter to multiply input torque and to release said stator for rotation in an opposite direction so that said converter acts as a fluid coupling when said turbine means accelerates to the speed of said pump, a turbine shaft and an intermediate shaft, first clutch means operatively connected to said shafts and selectively engageable to drivingly connect said turbine shaft to said intermediate shaft, a differential gear unit having a first member drivingly connected to said intermediate shaft, said gear unit having a second member drivingly connected to said transmission output means, said differential unit having a control member, second clutch means operatively connected to said differential unit for locking said differential unit for forward drive through said converter, variable displacement hydrostatic pump and motor means, said pump means being drivingly connected to said transmission input means, said motor means being drivingly connected to said control member, and displacement control means operatively connected to said hydrostatic units for controlling the displacement of said units and for increasing displacement to a predetermined displacement to drive said control member at a predetermined speed as said second clutch is released to produce a hydrostatic forward drive to said differential and for subsequently decreasing the displacement of said hydrostatic units to reduce the speed of said control member from said predetermined speed for extended output speed forward drive under constant engine speed conditions.

4. The transmission defined in claim 3 wherein said differential gear unit is a planetary gearset, said first and second members and said control member comprising a planetary gear carrier, a ring gear and a sun gear respectively of said planetary gearset which cooperate to provide an overdrive ratio when said sun gear is held stationary and when driven in a rearward direction by said hydrostatic motor and the carrier is driven by the vehicle engine, and selectively engageable brake means operatively connected to said carrier for providing for gear multiplied hydrostatic reverse drives of said output means when said clutches are released and said hydrostatic motor drives said sun gear.

* * * * *